United States Patent
Sitoh et al.

(10) Patent No.: US 7,066,664 B1
(45) Date of Patent: Jun. 27, 2006

(54) THREE WAY VIDEO CAMERA BASE

(75) Inventors: Yu Weng Alvin Sitoh, Singapore (SG); Weng Hong Benjamin Ng, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 11/346,965

(22) Filed: Feb. 2, 2006

Related U.S. Application Data

(63) Continuation of application No. 10/857,718, filed on May 28, 2004.

(51) Int. Cl.
   *G03B 17/00* (2006.01)
   *F16M 11/38* (2006.01)

(52) U.S. Cl. .................. 396/428; 248/440.1; 248/121; 248/126; 248/231.5; 248/439

(58) Field of Classification Search ................ 396/419, 396/428; 348/373, 375, 376; 248/121, 126, 248/166, 439, 183.2, 187.1, 231.1, 231.5, 248/440.1; D16/244, 245
See application file for complete search history.

(56) References Cited

U.S. PATENT DOCUMENTS

| | | | | |
|---|---|---|---|---|
| 3,833,196 | A | * | 9/1974 | Protzman ..................... 248/208 |
| D383,475 | S | * | 9/1997 | Yamauchi et al. ......... D16/202 |
| 5,855,343 | A | * | 1/1999 | Krekelberg .................. 248/121 |
| 6,431,507 | B1 | * | 8/2002 | Prather et al. .............. 248/166 |
| 6,663,066 | B1 | * | 12/2003 | Hong ..................... 248/231.41 |
| 6,738,094 | B1 | * | 5/2004 | Minami et al. ............. 348/373 |

* cited by examiner

*Primary Examiner*—W. B. Perkey
(74) *Attorney, Agent, or Firm*—Russell N. Swerdon

(57) ABSTRACT

A base for supporting a camera or other electronic device includes a body member connected by a hinge mechanism to a support member and configured to rotate about a camera tilt axis. The support member is attachable to the base of a video camera. Two front legs are fixed in position relative to the body member. A rear leg is attached by a pivot connection to the body member. The base is configured such that the rear leg may be moved by pivoting the rear leg about the rear leg pivot axis to engage a back surface of a laptop screen or flat monitor or onto a flat horizontal surface. The camera tilt axis and the rear leg pivot axis are substantially parallel.

17 Claims, 5 Drawing Sheets

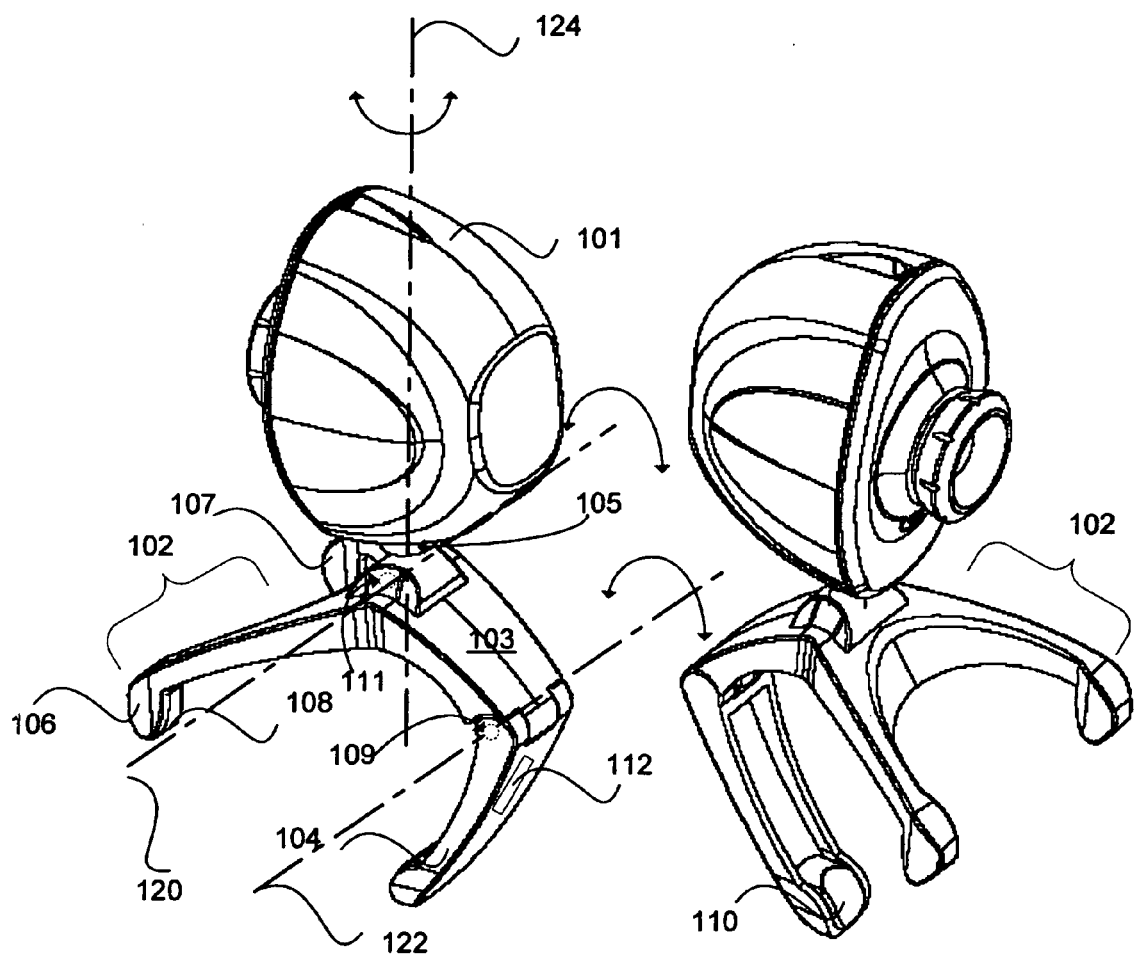
Fig._1A  Fig._1B

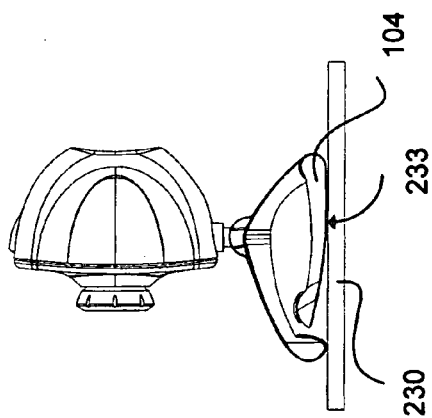
*Fig._2C*
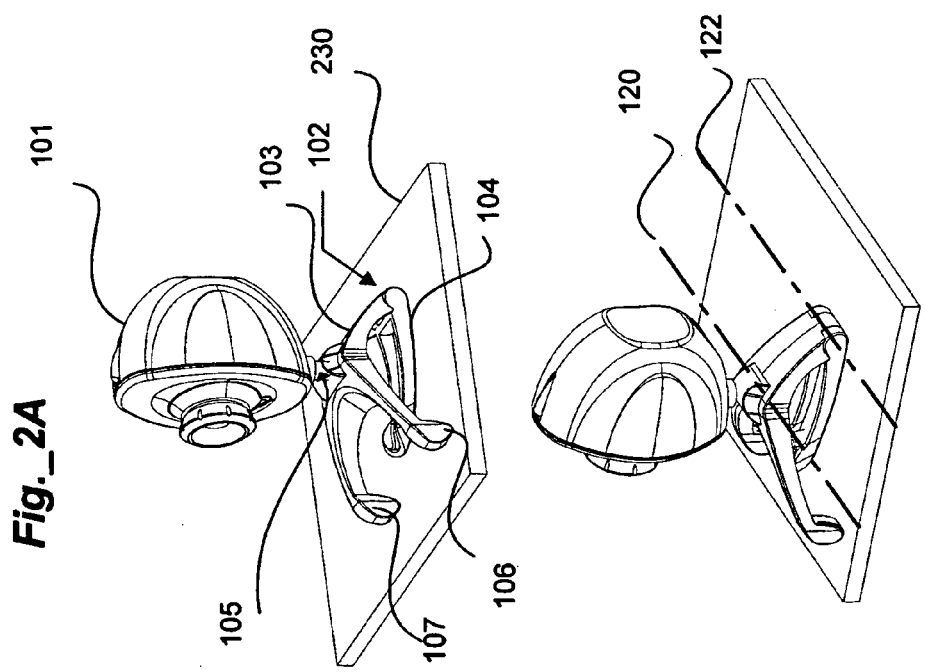
*Fig._2A*
*Fig._2B*

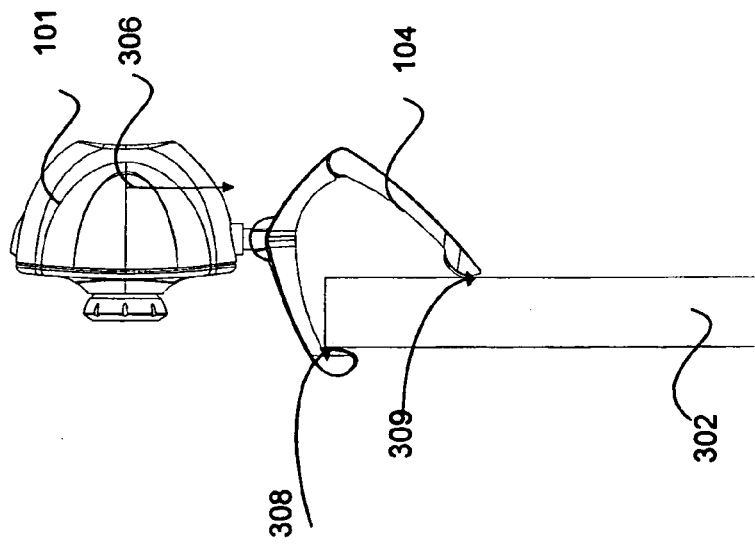

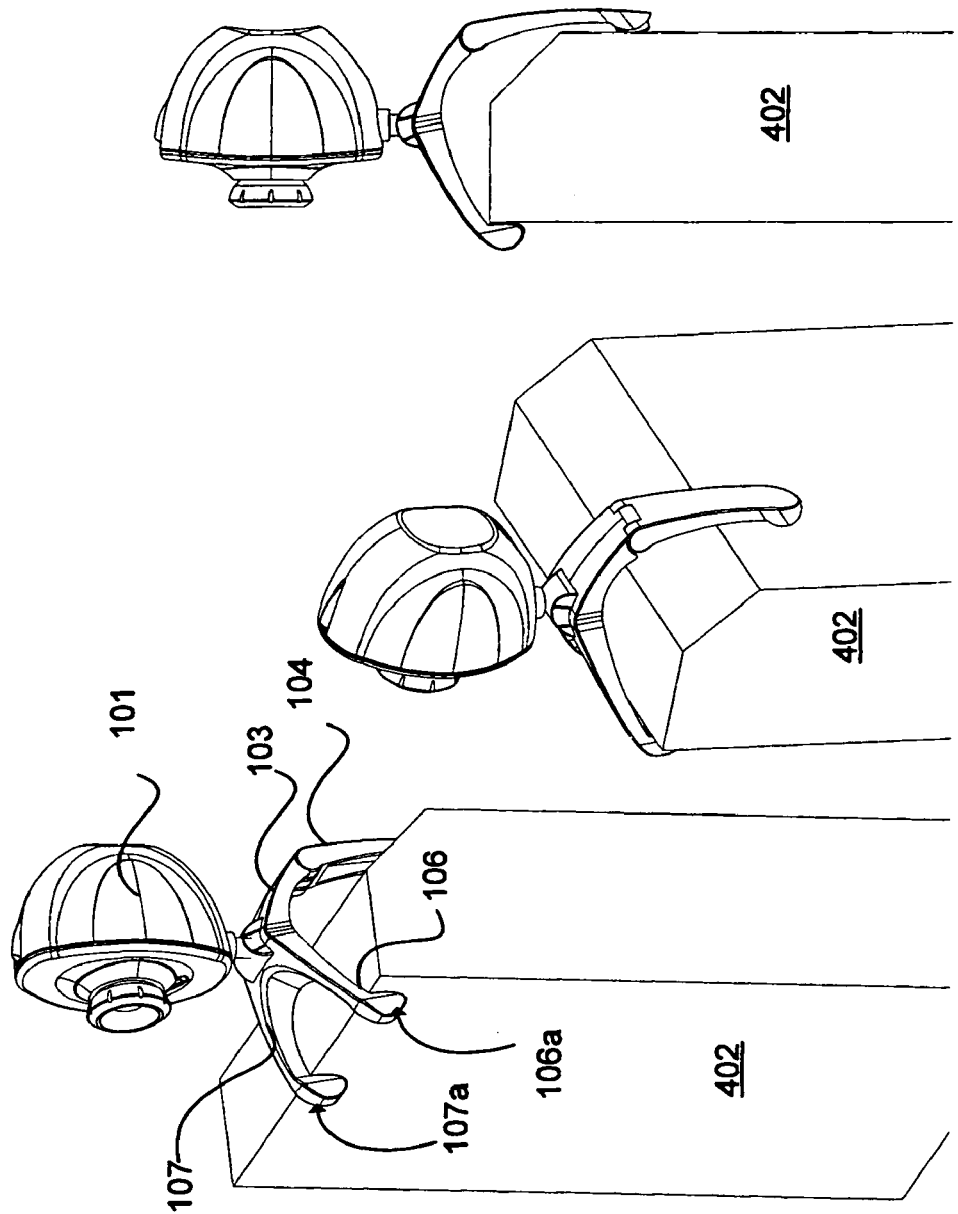

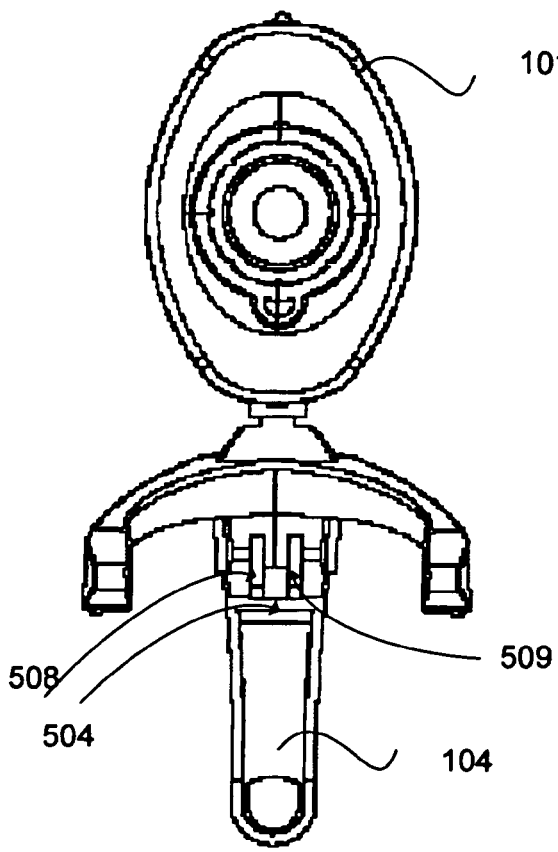
Fig._5A
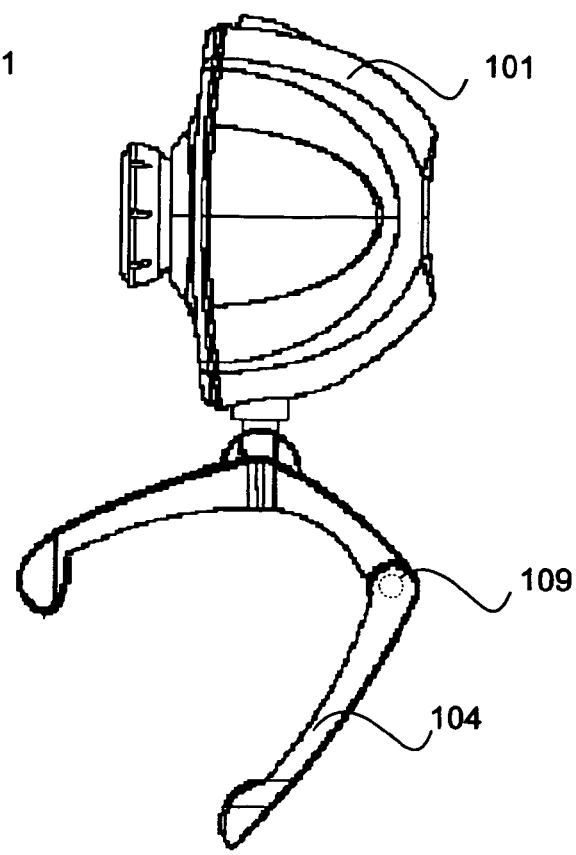
Fig._5B
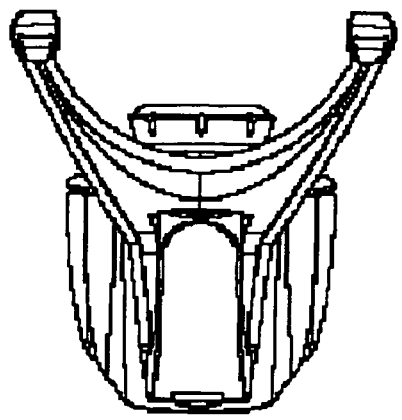
Fig._5C

THREE WAY VIDEO CAMERA BASE

CROSS-REFERENCES TO RELATED APPLICATIONS

This application is a continuation of application Ser. No. 10/857,718, entitled THREE WAY VIDEO CAMERA BASE, and filed on May 28, 2004, the specification of which is incorporated by reference herein in its entirety for all purposes.

BACKGROUND OF THE INVENTION

1. Field of the Invention

The present invention relates to supports for cameras. More particularly, the present invention relates to supports adaptable for supporting a video camera coupled to a computer, including desktop and laptop models.

2. Description of the Related Art

The personal computer market has grown rapidly in the past decade. Recent trends have focussed on the configuration of the computer to perform a variety of user defined functions, including connecting to the internet and communicating with others also so connected. Video cameras have increasingly been used to augment the communication between individuals using the internet. For example, "web cameras", typically CCD cameras have been used first to capture still photos and transmit the photos to other computer users via email or through instant messaging arrangements. Further, video cameras have also been used to transmit videos, at different frame rates and resolutions depending upon the available bandwidth, to provide video telephone functions when coupled with voice over IP protocols.

At the same time, laptop computers, i.e., portable computers, have captured an increasingly larger proportion of overall computer sales. Unfortunately, many of the video cameras performing the aforementioned functions offered employ a tripod support structure, which, while suitable for a flat surface such as a desktop or the top surface of a CRT screen, cannot be used with the relatively thin LCD screens often found on laptops. Accordingly, what is needed is an improved base or support that can also be used with a variety of computers, including both laptops and desktops.

SUMMARY OF THE INVENTION

To achieve the foregoing, the present invention provides a base for supporting a camera or other electronic device and for use in conjunction with a computer. In accordance with one embodiment, a base includes a body member connected by a front hinge joint formed along a camera tilt axis to a support member. Two front legs are fixed in position relative to the body member. A rear leg is attached by a pivot connection to the body member, the pivot connection formed along a rear leg pivot axis. Preferably, the camera tilt axis and the rear leg pivot axis are substantially parallel.

The extendible rear leg is pivotally attached to the body member of the base to provide a reliable means of attaching the camera to a display screen, such as a flat panel display or laptop screen. The action of the pivot connection preferably is such that the movement of the rear leg is constrained within one degree of freedom of rotation and to provide convenient adjustment for attachment to a variety of screen monitors, such as including laptop display screens, flat panel display screens, as well as for positioning on horizontal surfaces.

According to another embodiment, a base for supporting a camera is provided. A support member is configured for attachment to the underside of the camera. A body member is pivotally attached to the support member. The body member includes a fixed front projecting portion extending in a frontward and downward direction and a rear leg pivotally attached to the body member. According to one variation of this embodiment, at least a left part of the front projecting portion and a right part of the front projecting portion are configured to engage a viewing surface of a laptop display screen by hooking onto the laptop screen.

According to yet another embodiment, a base for supporting a camera on a variety of surfaces includes a support member attachable to the underside of the camera, a body member pivotally attached to the support member. The body member includes two fixed front legs. A rear leg is pivotally attached to the body member.

These and other features and advantages of the present invention are described below with reference to the drawings.

BRIEF DESCRIPTION OF THE DRAWINGS

FIGS. 1A–1B are perspective views illustrating a camera base in accordance with one embodiment of the present invention.

FIGS. 2A–2C are perspective views illustrating a base supporting a camera on a horizontal surface in accordance with one embodiment of the present invention.

FIGS. 3A–3C are perspective views illustrating a base supporting a camera on a top portion of a laptop screen in accordance with one embodiment of the present invention.

FIGS. 4A–4C are perspective views illustrating a base supporting a camera on a top portion of a flat panel screen in accordance with one embodiment of the present invention.

FIGS. 5A–5C are respectively front, elevation, and bottom views illustrating a base supporting a camera in accordance with one embodiment of the present invention.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known features have not been described in detail in order not to unnecessarily obscure the present invention.

The present invention provides a base suitable for supporting a camera, such as a webcam, on a variety of surfaces. A support member such as a post is coupled to and rotates about a camera tilt axis relative to the body member of the base. By providing a rear leg that pivots about a rear leg pivot axis, independent of the tilting movement of the support post, the base is adaptable for mounting a camera directly on a laptop screen or a flat screen panel. Alternatively, by folding the rear leg to its fully retracted position, the base may be used to support a camera on a flat horizontal surface, such as a table, desktop, or the top surface of a conventional CRT monitor. With the rear leg fully retracted, the base presents a compact form for storage or transport.

FIG. 1A is a perspective view illustrating a camera base in accordance with one embodiment of the present invention. The base 102 includes a body member 103 pivotally attached to a rear leg 104, such that the rear leg rotates about a rear leg pivot axis 122. The body member 103 is further preferably coupled with a support member 105 via a front hinge joint 111. The support member 105 may comprise any suitably configured link providing a pivoting connection with the body member 103 such as to provide a pivoting action about camera tilt axis 120. That is, the support member may comprise a thin neck portion or a substantially wider supporting plate and still be in keeping with the spirit and scope of the present invention. Preferably, according to an alternative embodiment, an attached camera 101 is configured to rotate about a camera pan axis 124 relative to the support member 105, thereby providing a panning capability to the camera. Preferably, the camera pan axis 124 is substantially perpendicular to the camera tilt axis 120 and the rear leg pivot axis 122.

The front legs are preferably located to minimize intrusion on the viewing area of the laptop or flat screen monitor. By projecting the tips of the front legs downward, the intrusion can be minimized. That is, preferably, the tips located at the distal ends of the front legs are formed such that they hook onto the front of the screen when the base is mounted on the screen. Preferably, and in accordance with one embodiment, the front legs are spaced apart at least one inch. Alternatively, when mounted or placed on a flat horizontal surface, a bottom portion of the leg tips make contact with the flat surface. Preferably, a resilient pad 108 is attached to the distal portion of the front legs as well as a similar resilient contact pad 110 attached to the distal portion of the rear leg. Preferably, the resilient contact pads 108, 110 will have a size large enough to cover the contact points of the tips in any of the configurations. For example, the resilient contact pads 108 cover the front leg tips in one embodiment, circumscribing an arc of about 90 degrees or more on the contact portions of the front tips. Preferably, the rear leg is provided with two separate contact pads, a first resilient contact pad 110 provided on the distal portion of the rear leg 104 and a second resilient contact pad 112 provided on the opposite surface of the proximal portion of the real leg 104. That is, the second resilient contact pad is provided on a rear facing surface of the rear leg 104 and the first resilient contact pad 110 is positioned on the front facing surface of the rear leg 104. The rear and front facing designations are descriptive of the rear leg position of the base when the base 102 is hung on a laptop or flat monitor screen. As used herein, distal and proximal portions of the rear legs are determined from the rear hinge joint 109, whereas the distal portions of the front legs are described relative to their fixed attachment point to the body member 103.

The rear hinge joint 109, formed along the rear leg pivot axis 122, is preferably provided with sufficient compliance such that the rear leg is adjustable through a range of movement, for example at least 90 degrees from full extension to full retraction, and further capable of providing an infinite number of adjustable positions within this range. Preferably this is accomplished by providing sufficient compliance within the hinge joint itself. Methods of providing compliance within hinge joints are known to those of skill in the art and therefore full details will not be provided herein. This range of motion provides an opening between the front leg tips and the distal portion of the rear leg suitable for mounting or "hanging" the base on a variety of laptop screen and flat monitor screens. More preferably, the range of movement of the rear leg from full retraction (i.e., completely folded) to full extension lies in the range of 90 to 135 degrees. The upper limit to the extension enables the base to be used on relatively wide, e.g., 3 inch wide flat screen monitors without the rear leg losing its angular adjustment and slipping out of position on the rear face of the monitor.

In particular, the rear leg 104 is preferably configured such that the rear hinge joint 109 provides the rear leg with only one degree of freedom of rotation. Likewise, the front hinge joint 11 is preferably configured to provide the support member 105 with only one degree of freedom of rotation relative to the body member 103.

By providing the rear leg pivot axis substantially parallel with the camera tilt axis, the range of motion provided for support member tilt can be reduced while still providing a base suitable for use with a camera mounted on a laptop screen itself having a wide range of tilt positions depending on the particular user's preferences. In other words, attaching a camera to the support member such as a support post that is tilted relative to the body member and also providing the rear leg that is adjustable relative to the body member, using respectively parallel axes, enables the base to be mounted on a laptop screen in a stable, unobtrusive manner that is optimized for the particular dimensions of the screen and the tilt of the screen.

Preferably the body member is formed with a concave surface formed in its underside as illustrated in FIG. 1A. This permits the rear leg to be completely retracted for mounting the base on a horizontal surface such as a table or desktop. According to yet another embodiment, the rear leg is provided with a resilient and slip resistant second contact pad 112 on its proximate portion, as illustrated in FIG. 1A and as described earlier. When the rear leg is fully retracted, the front legs and the second contact pad 112 provide a three point contact for the base. As illustrated in FIGS. 2A–2C, preferably the rear leg, when fully retracted, tucks away into the recess formed in the body member. It should be appreciated that the front legs may be formed in a variety of configurations and yet still allow the rear leg to be foldable for compact transport or storage. That is, the body member 103 may be integrally formed with the front legs, thus fixing their position. Alternatively, the front legs 106, 107 may be fixed to the body member 103 with suitable adhesives or fasteners according to methods known to those of skill in the relevant arts. The configurations illustrated in FIGS. 1–5 are intended to be illustrative and not limiting.

In accordance with the present embodiment, the body member 103 is configured to rotate about a camera tilt axis 120, whereas the rear leg 104 is configured to rotate about a rear leg pivot axis 122 in relation to the body member. This configuration provides suitable relative movement of the rear leg 104 relative to the front legs 106, 107 such that the base 102 may be adapted to placement on a variety of computer monitors, ranging from a laptop panel as further illustrated in FIGS. 3A–3C to a flat panel display as further illustrated in FIGS. 4A–C.

FIGS. 2A–2C are perspective views illustrating a base supporting a camera on a horizontal surface in accordance with one embodiment of the present invention. It should be noted herein that throughout the various drawings like numerals refer to like parts. The various drawings illustrated and described herein are used to illustrate various features of the invention. To the extent that a particular feature is enumerated in one drawing and not another, except where otherwise indicated or where the structure inherently prohibits incorporation of the feature, it is to be understood that those features may be adapted to be included in the embodiments represented in the other figures, as if they were fully illustrated in those figures.

As illustrated in FIGS. 2A–2C, camera 101 is shown supported by base 102 on a flat, horizontal surface 230. This configuration is suitable for mounting of the camera and base on a table, desktop, or a top flat surface of a conventional CRT monitor. It is to be understood that this configuration is also suitable for flat surfaces deviating from perfectly horizontal. That is, conventional CRT monitors are often tilted slightly for adjustment to a particular viewer's height, eye location, etc. The present configuration of the camera and base is intended to extend to work suitably with all reasonable tilt angles, for example up to 30 degrees or more from horizontal. Providing the base with the camera tilt axis 120 substantially parallel with the rear leg pivot axis 122 adds to the stability of the base in this configuration. Preferably, in this configuration, the range of motion of the camera about the camera tilt axis 120, i.e., the tilting of the support member 105, is at least 30 degrees and more preferably about 60 degrees. By constraining the support member 105 tilt motion in this manner, and hence constraining the camera 101 to tilt a corresponding amount, the camera may be used in conjunction with the base to tilt upwards (for example, when placed on a desktop) or downwards, for example, from the top of a CRT monitor. The angular limitations described above are intended to be illustrative and not limiting. It is preferable that the adjustment of the rear leg be used to maintain the body member 103 at a relatively level position, no matter which mounting configuration is selected, and thus only a small range of angular motion is required for the titling of the support member (and hence the camera) along the camera tilt axis. This limitation is desirable, in some cases, to avoid problems resulting from providing a substantially larger range of angular motion at the front hinge joint, for example, contributing to a premature failure of the front hinge joint.

In this configuration, the front legs 106, 107 provide a three contact point supporting structure in conjunction with a proximal portion of the rear leg. Preferably, each of the front legs and the rear leg proximal portion include a resilient contact surface for slip proof positioning. For example, resilient contact pads 108, 112 as shown in FIG. 1A may be used. That is, resilient contact 112 or any other suitable configured contact pad, may be positioned at the rear leg contact point 233.

FIGS. 3A–3C are perspective views illustrating a base supporting a camera on a top portion of a laptop screen in accordance with one embodiment of the present invention. The camera 101 and base 102 are preferably configured such that the front legs wrap or hook around the front surface of the laptop screen 302. By extending the tips of the front legs downward and covering the contact points of the tips with a resilient material, the tips 106a, 107a provide only a minimal intrusion on the viewing surface 303 of the laptop screen 302. Dimensions of the leg tips can vary and still be in conformity with the spirit and scope of the present invention. In the embodiment illustrated, a suitable size for the tips may be as small as one-quarter inch. In other words, preferably the tips are sized such that a hooking action is provided with a minimal intrusion onto the viewing area. In this configuration, three contact points are provided with the laptop screen, including each of the front leg contact points 308 on the viewing (front) surface of the screen and a rear leg contact point 309 between the distal portion of the rear leg and the rear surface of the laptop screen 302.

Preferably, the base 102 includes a rear leg 104 having a length slightly less than the distance between the rear hinge joint 109 and the tips 106a, 107b of the front legs 106, 107. By configuring the links forming the base in this way, body member 103 can maintain a substantially level configuration, whether the base is placed on the desktop or top surface of a CRT monitor (See FIGS. 2A–2C), mounted on a laptop screen (See FIGS. 3A–3C), or mounted on a flat screen (See FIGS. 4A–4C). In accordance with one embodiment, the rear leg 104 has a length of about 2 inches, a distance between the front leg tips and the rear pivot axis of about 2¼ inches, and a distance between the camera tilt axis and the rear pivot axis of about 1 inch.

In accordance with one embodiment, and as further illustrated in FIG. 3C, the base is configured to preferably receive a camera having its center of gravity 306 located at a sufficient distance to the rear of the contact point 309 of the rear leg with the back of the laptop screen to enhance the stability of the device. That is, an optimized location of the center of gravity of an attached camera relative to the base may be predetermined by considering the weight of the camera and the dimensions of the base, particularly the length of the rear leg and the distance between the rear leg pivot axis and the contact point of the rear surface of the laptop screen. Further, the location of the center of gravity is a function of the rearward tilting of the body member when placed in its desired mounted position. Preferably, the force created by the weight at the center of gravity of the camera will result in ample normal force being applied at point 309 of the rear surface of the laptop screen 302 by the resilient pad at the distal end of the rear leg, such as to hold the camera in a suitable position without the rear leg "slipping" downward. In other words, the location of the center of gravity towards the rear helps in providing stability to the base. In accordance with one embodiment, a camera and base combination is provided. The weight and positioning of the center of gravity of the camera is selected to provide a threshold normal force when the base-camera combination is mounted on either a laptop screen or flat screen monitor.

FIGS. 4A–4C are perspective views illustrating a base supporting a camera on a top surface of a flat panel screen in accordance with one embodiment of the present invention. In this configuration, the distance between the distal portion of the rear leg 104 and the tips 106a, 107a of the front legs 106, 107 is increased to accommodate the greater width of the flat panel screen 402. Again, preferably three point contact is made using resilient contact surfaces on the distal portions of the front legs and the rear leg respectively. Preferably, the rear leg 104 is adjustable about the rear leg pivot axis to provide an opening for secure mounting onto a laptop or flat screen. Preferably the opening is adjustable within the range of ⅛ inch to about 4 inches, more preferably ¼ inch to 3 inches. By providing two front legs on the front face of the screens and the rear leg on the rear face of the screens, i.e., straddling the screen, the embodiments shown in FIGS. 3A–3C as well as FIGS. 4A–4C provide a secure mounting method for the various embodiments of the base and camera.

FIGS. 5A–5C are respectively front, elevation, and bottom views illustrating a base supporting a camera in accordance with one embodiment of the present invention. In order to prevent the rear leg from retracting, in the folded position, to a point where contact with the flat surface is made with the rear hinge joint 109 rather than the resilient surface 112 as illustrated in FIG. 1A, a projection 504 and stops 508, 509 are provided. These are used in conjunction with each other to constrain the folded angle of the rear leg.

The structure described herein provides a base for use for example with a web camera. The base coupled with the camera may be positioned in a variety of configurations including but not limited to atop a conventional PC CRT monitor, on a table, mounted at the top portion of a laptop screen, or mounted at the top portion of a flat screen. The base is foldable to provide compact storage or transport.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A base for supporting a camera comprising:
   a support member configured for attachment to the underside of the camera;
   a body member pivotally attached to the support member, said body member having a fixed front projecting portion extending in at least a frontward direction; and
   a rear leg pivotally attached to the body member by a rear hinge joint having a compliance level adapted to maintain a user adjustable position of the rear leg relative to the body member.

2. The base as recited in claim 1 wherein the front projecting portion comprises at least one leg extending downward from the position of the support member.

3. The base as recited in claim 1 wherein at least a left part of the front projecting portion and a right part of the front projecting portion are configured to engage a viewing surface of a laptop display screen by hooking onto the laptop screen.

4. The base as recited in claim 3 wherein the left part and the right part are at least one inch apart.

5. The base as recited in claim 2 wherein the front projecting portion comprises two legs.

6. The base as recited in claim 2 wherein the front projecting portion is integrally formed with the body member.

7. The base as recited in claim 1, wherein the support member pivots in relation to the body member along a camera tilt axis and the rear leg pivots in relation to the body member along a rear leg pivot axis, and wherein the camera tilt axis and the rear leg pivot axis are substantially parallel.

8. The base as recited in claim 7, wherein the support member is configured such that an attachable camera pivots along a camera pan axis that is substantially perpendicular to the camera tilt axis and the rear leg pivot axis.

9. The base as recited in claim 1, wherein the front projecting portion further comprises resilient material positioned on the distal portion and configured to engage one of a flat surface and a front of a laptop screen.

10. The base as recited in claim 1, wherein the front projecting portion comprises at least one resilient pad located on the proximal portion to the rear hinge such that the resilient pad contacts a horizontal surface when the rear leg is folded and the base rests upon said surface.

11. The base as recited in claim 1, wherein the rear leg is adjustable in a first position to rest on a flat surface, in a second position to provide contact with a rear face of a laptop screen, and in a third position to provide contact with the rear face of a flat monitor screen being relatively wider than the laptop screen.

12. A base for supporting a camera comprising:
    a body member configured for attachment to a camera, said body member having a front projecting portion configured to contact a planar surface; and
    a rear leg pivotally attached to the body member by a rear hinge joint having a compliance level adapted to maintain a user adjustable position of the rear leg relative to the body member.

13. The base as recited in claim 12 further comprising a support member pivotally attached to the body member, said support member configured for attachment to an underside of a camera.

14. The base as recited in claim 13 wherein the projecting portion is configured to contact a planar surface such that the distance between the leftmost portion of the contact with the planar surface to the rightmost portion is at least one inch.

15. The base as recited in claim 14 wherein the projecting portion comprises a right leg and left leg, the left leg defining the leftmost portion of the contact and the right leg defining the rightmost portion of the contact, said right and left legs fixed in position relative to the rest of the body member.

16. A camera having a base for supporting the camera on a variety of surfaces comprising:
    a support member attached to the underside of the camera;
    a body member pivotally attached to the support member, the body member having a front projecting portion configured for engaging one of a viewing plane of a laptop screen or a horizontal surface; and
    a rear leg pivotally attached to the body member by a rear hinge joint having a compliance level adapted to maintain a user adjustable position of the rear leg relative to the body member.

17. The camera as recited in claim 16 wherein the weight of the camera and positioning of the center of gravity of the camera relative to the support member, body member, and rear leg comprising the base is selected to provide a threshold normal force to the rear surface of a screen or monitor when the base-camera combination is mounted on either a laptop screen or flat screen monitor.

* * * * *